United States Patent
Landry et al.

(10) Patent No.: US 6,687,350 B1
(45) Date of Patent: Feb. 3, 2004

(54) SMART CARD READER AND TRANSACTION SYSTEM

(75) Inventors: Benoit Landry, Charlesbourg (CA); Francois Dugre, Cap-de-la-Madeleine (CA); Stephane Fortier, St-Georges (CA)

(73) Assignee: Bell Canada, Montreal (CA)

(*) Notice: Subject to any disclaimer, the term of this patent is extended or adjusted under 35 U.S.C. 154(b) by 0 days.

(21) Appl. No.: 09/179,149

(22) Filed: Oct. 26, 1998

(51) Int. Cl.[7] .................................. H04M 17/00
(52) U.S. Cl. ........................ 379/144.04; 379/211.05; 455/558; 902/25
(58) Field of Search ................. 379/93.02, 93.01, 379/93.12, 93.17, 93.18, 91.02, 386, 52, 221.09, 144.04, 211.05; 235/379, 380; 709/218; 455/558; 902/25

(56) References Cited

U.S. PATENT DOCUMENTS

| | | | |
|---|---|---|---|
| 4,798,322 A | | 1/1989 | Bernstein et al. |
| 5,280,625 A | * | 1/1994 | Howarter et al. ............ 709/218 |
| 5,343,514 A | * | 8/1994 | Snyder ...................... 379/93.01 |
| 5,740,232 A | * | 4/1998 | Pailles et al. ............. 379/93.02 |
| 5,748,737 A | | 5/1998 | Daggar ......................... 380/24 |
| 5,850,599 A | * | 12/1998 | Seiderman ................... 455/404 |
| 6,000,607 A | * | 12/1999 | Ohki et al. .................. 235/379 |
| 6,061,664 A | * | 5/2000 | Pieterse et al. ................ 705/39 |
| 6,075,842 A | * | 6/2000 | Engelke et al. ................ 379/52 |
| 6,215,863 B1 | * | 4/2001 | Bennett et al. ............ 379/221.09 |
| 6,442,532 B1 | * | 8/2002 | Kawan ......................... 705/35 |
| 6,466,657 B1 | * | 10/2002 | Anvret et al. ............. 379/93.12 |

FOREIGN PATENT DOCUMENTS

| | | | |
|---|---|---|---|
| EP | 97301203 | 2/1997 | ............ G07F/7/08 |
| JP | 05-020327 A | * 1/1993 | |

* cited by examiner

Primary Examiner—Minsun Oh Harvey
Assistant Examiner—Con P. Tran
(74) Attorney, Agent, or Firm—Alston & Bird LLP

(57) ABSTRACT

A smart card reader and transaction system which uses the voice path of a switched telephone network to effect smart card transactions are described. The smart card reader may be used with either a regular telephone or an ADSI telephone. If the telephone is not a handsfree set, the smart card reader is preferably connected between the base set and the handset. If the telephone is a handsfree model, the card reader is positioned between the base set and the switched telephone network. A smart card application server controls the smart card reader and switches it between a user mode and a card communications mode. Most applications software resides on the application server so that the smart card reader is simple to construct and inexpensive to manufacture. The advantage is a simple, portable, inexpensive yet reliable system adapted to be owned and used by the general public.

44 Claims, 2 Drawing Sheets

SMART CARD READER AND TRANSACTION SYSTEM

TECHNICAL FIELD

The present invention relates to smart card transaction systems and, in particular, to a smart card reader and transaction system that uses a voice path through a switched telephone network to effect smart card transactions.

BACKGROUND OF THE INVENTION

Remote transactions effected by telephone connections have been developed to a significant extent over the past few years. They are effected using a telephone network connection between a transaction terminal and an application server. The application server may send voice prompts to the user, who responds using the keys of the terminal keypad. The signals returned to the application server are generally of the dual tone multi-frequency (DTMF) type. These transactions generally occur at a location remote from a bank or a credit bureau. A disadvantage of such systems is that it is relatively easy for a person to use a misappropriated card or for a legitimate card owner to exceed their credit limit. Most merchants, therefore, require that before purchases above a relatively modest amount are completed, an authorization must be verified with the bank or credit bureau, as appropriate. Even with automated dialling, the procedure is also cumbersome and time consuming. Furthermore, a separate card is required for each account.

In this particular use of a telephone network, there is a vital need for security when the transactions of a monetary type, such as electronic funds transfer are effected and, in more general terms, whenever there is a risk of fraud.

In order to provide a requisite level of security, telephone terminals have been invented with data processing capability and an RS 232 serial data interface connected to a smart card reader. Such telephone terminals incorporate software programs appropriate for data communications with an application server. The card reader is used with a smart card enabled with security functions, such as user passwords, the authentication of host applications, assistance in the authentication of the card by a host application and the recordal of transactions, etc.

Such smart cards and smart card readers are well known in the art. Smart card readers read and write to smart cards using various contacts for data transfer. As an example, U.S. Pat. No. 4,798,322 which issued on Jan. 17, 1989 to Bernstein et al. is entitled CARD READER/WRITER STATION FOR USE WITH A PERSONAL MEMORY CARD USING DIFFERENTIAL DATA TRANSFER. This patent describes a card reader arranged for use with a contactless smart card. The card reader is adapted to interface with an application station such as a factory editing station, an office editing station, issue editing station, public telephone station or any other station suitably configured for interfacing with a smart card.

Although such devices are satisfactory for certain applications, they suffer from the disadvantage of requiring telephone terminals equipped with a data processing peripheral connector. Ordinary telephone terminals are not generally equipped with such a connector so that the devices are not adapted to be owned and operated by the general public.

Efforts have been developed to overcome this disadvantage by offering a simple way to perform transactions using standard telephone terminals. U.S. Pat. No. 5,740,232, for example, which issued on Apr. 14, 1998 to Pailles et al. and is entitled SMART CARD BASED SYSTEM FOR TELEPHONE-SECURIZED TRANSACTIONS, discloses a smart card reader which incorporates a smart card reader, a sound transmission device, a display surface and a keypad as well as a plurality of function keys. The smart card reader uses a PSTN voice path to communicate with an application server but does so in one direction by sound signals which are generated by the smart card reader and received by the telephone handset. In the other direction, the application server communicates through the telephone handset with the user who transcribes the information into the smart card reader using the keypad. The disadvantages of this system are apparent in that interference from environmental noise can obviously effect transactions and errors or fraud may occur because of the manual operation involved in one-way information transmission. Those disadvantages may have an undesirable impact on the reliability of the device. Therefore, there exists a need for a smart card reader which may be connected to an ordinary telephone terminal and a system which enables the smart card reader to work securely and reliably.

SUMMARY OF THE INVENTION

An object of the invention is to provide a smart card reader which may be connected to an ordinary telephone terminal to communicate with an application server for a smart card transaction.

Another object of the invention is to provide a portable smart card reader which may be connected to a telephone terminal to permit a keypad of the telephone terminal to be used to input information during communication with an application server for smart card transactions.

Another object of the invention is to provide a smart card transaction system which uses a voice path through a switched telephone network to communicate with a smart card application server.

Yet another object of the invention is to provide a smart card transaction system that enables a portable smart card reader to operate in conjunction with a telephone terminal for smart card transactions.

A further object of the invention is to provide a method of using a voice path through a switched telephone network to effect smart card transactions.

In accordance with one aspect of the invention, there is provided a portable smart card reader adapted for communication with an application server using a voice path of a switched telephone network, comprising:

- a smart card reader/writer unit for reading information from and writing information to a smart card;
- a front-end linked to the smart card reader/writer unit adapted to selectively connect the smart card reader/writer unit to a telephone line, that is shared with a telephone terminal, for communication with the application server and to selectively disconnect the smart card reader/writer unit from the telephone line to permit a keypad of the telephone terminal to be used as a user interface for input of information during a smart card transaction session; and
- a micro-controller associated with the smart card reader/writer unit and the front-end for operational control of each.

The front-end may be connected in series between a base set and a handset of the telephone terminal or in line between the telephone terminal and the switched telephone network.

Preferably, the micro-controller controls a mode selection between a card communication mode and a user input mode during a card transaction session, and mutes the handset in the card communication mode.

The smart card reader preferably comprises a connection detector associated with the micro-controller and the front-end for detecting a connection signal sent from the application server to activate the card communication mode. The user input mode is preferably a default mode.

In accordance with a second aspect of the invention, there is provided a smart card transaction system that uses a voice path through a switched telephone network to perform smart card transactions, comprising:

an application server connected to the switched telephone network;

a telephone terminal connected to the switched telephone network, the telephone terminal having a keypad; and a portable smart card reader for communication with the application server, including:
  a smart card reader/writer unit for reading information from and writing information to a smart card;
  a front-end linked to the smart card reader/writer unit for selectively connecting the smart card reader/writer unit to a telephone line, that is shared by the telephone terminal, for communication with the application server and selectively disconnecting the smart card reader/writer unit from the telephone line to permit a keypad of the telephone terminal to be used as a user interface for input of information during a smart card transaction session; and
  a micro-controller associated with the smart card reader/writer unit and the front-end for operational control of each.

The micro-controller preferably controls a mode selection between a card communication mode and a user input mode during the card transaction session and mutes the handset or the telephone in the card communication mode.

The application server preferably comprises application software for providing services; a first interface associated with the application software to communicate with and control the telephone; and a second interface associated with the application software to communicate and control the smart card reader.

The second interface preferably generates a connection signal to prompt the smart card reader to switch to the card communication mode.

In accordance with a third aspect of the invention, there is provided a method of using a voice path through a switched telephone network for a smart card transaction comprising the steps of:

a) receiving a call for the transaction from a telephone terminal connected to a telephone line of the switched telephone network at an application server which is connected to the switched telephone network;

b) verifying from the application server that a smart card reader is connected to the telephone line of the switched telephone network and a smart card is properly associated therewith;

c) receiving at the application server smart card user ID information which is input using a keypad of the telephone terminal in a user input mode;

d) verifying at the application server the smart card user ID information by retrieving smart card user ID information from the smart card in a card communication mode and comparing the retrieved information with the input information;

e) receiving at the application server transaction information which is input from the keypad in the user input mode;

f) exchanging transaction data between the smart card and the application server in the card communication mode; whereby the application server is adapted to prompt the smart card reader to switch selectively between the user input mode that permits input through the keypad of the telephone terminal and the card communication mode that permits information exchange between the smart card and the application server.

The application server preferably sends a connection signal to activate switching from the user input mode to the card communication mode.

The advantages of the invention are apparent. First, it provides a simple smart card reader which may be manufactured at low cost. The smart card reader according to the invention enables input through the keypad of the telephone terminal so that the smart card reader does not require a keypad and has no moving parts except a few function keys. Second, it is simple and convenient to connect the smart card reader to a public switched telephone network (PSTN). The smart card reader shares a single telephone line with a telephone terminal that may or may not be an analogue display service interface (ADSI) telephone and requires no modification of the telephone terminal to function therewith. Third, it overcomes the disadvantages of similar prior art smart card readers. There are no sound signals transmitted from the smart card reader to the PSTN through air, no manual typing involved in the transmission of data from the application server so that the smart card reader is able to provide services in a more reliable and more secure manner. The above advantages enable the invention to be widely used by the general public and enables smart card transactions to be performed from home.

BRIEF DESCRIPTION OF THE DRAWINGS

The invention will be better understood from the detailed description of the embodiments in conjunction with the accompanying drawings in which.

DETAILED DESCRIPTION OF THE PREFERRED EMBODIMENT

Figure 1A:
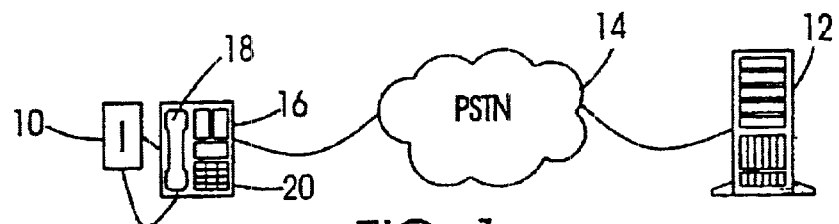
FIG. 1a is a diagram of a smart card transaction system using a voice path through a public switched telephone network; in which a smart card reader is connected between a base set and handset of a telephone.

FIG. 1a shows a preferred embodiment of the invention. A smart card reader 10 in accordance with the invention uses the voice path of a PSTN 14 for communication with an application server 12. The smart card reader 10 is connected between a handset 18 and a base set 20 or between the base set 20 and the PSTN as will be described below in more detail. The smart card reader 10 may be used with an ADSI telephone or a regular telephone. The application server 12 uses a V.8 bis connection protocol to prompt the smart card reader 10 to mute the handset 18 or the telephone terminal 16 to permit an exchange of data between the smart card reader 10 and the application server 12. If the telephone terminal is not an ADSI telephone, all interactions with the user are accomplished using an interactive voice response (IVR) application server.

Figure 1B:
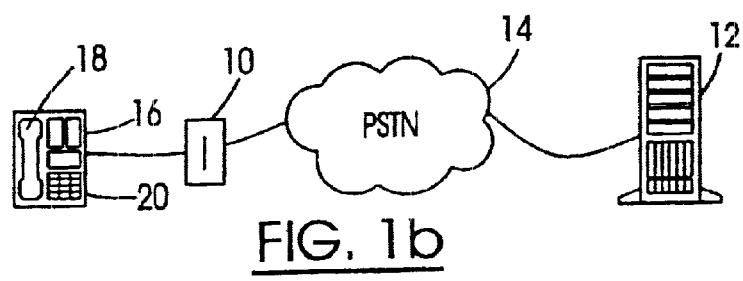
FIG. 1b is a diagram of a smart card transaction system using a voice path through a public switched telephone network; in which a smart card reader is connected between the telephone and the public switched telephone network.

FIG. 1b shows an alternate arrangement of the system shown in FIG. 1a in which the smart card reader 10 is connected between the telephone base set 20 and the PSTN 14. This arrangement is used with handsfree telephones and the like. As will be explained below in more detail, the only modification required to the smart card reader to support this arrangement is a provision to provide simulated telephone line current to the base set 20 when the card reader is in card communication mode and the base set 20 is disconnected from the PSTN 14.

Figure 2:
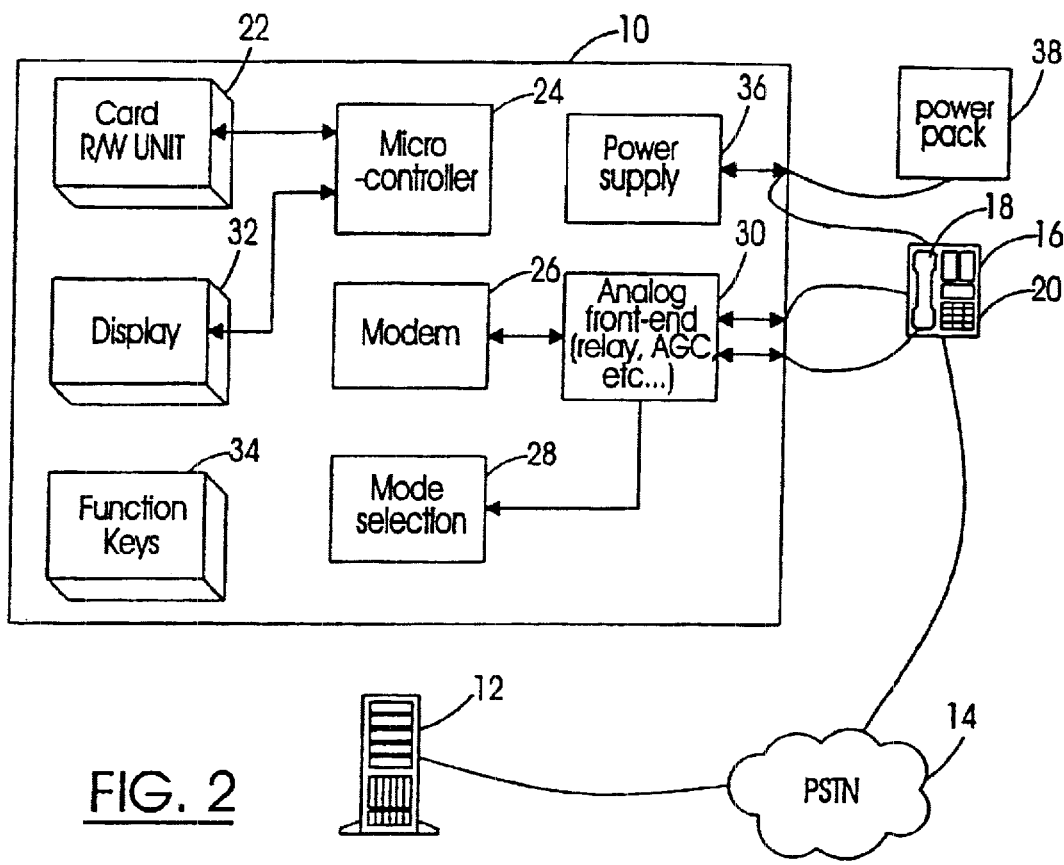
FIG. 2 is a block diagram of a smart card reader used in the system of FIG. 1, showing the functional structure of the smart card reader.

As illustrated in FIG. 2, the smart card reader 10 includes a smart card reader/writer unit 22, micro-controller 24, modem circuit 26, a mode selection circuit 28 and an analogue front-end 30 that respectively support the required functionality of the smart card reader 10. An LCD display 32 provides a display surface for displaying status messages. Function keys 34 permit users to select pre-programmed functions. A power supply unit 36 connect to a power pack 38 provides operating current to the smart card reader 10. The connection of the smart card reader 10 with the handset 18 and base set 20 is through the analogue front-end 30. The functions of those components are described in more detail below.

Figure 3:
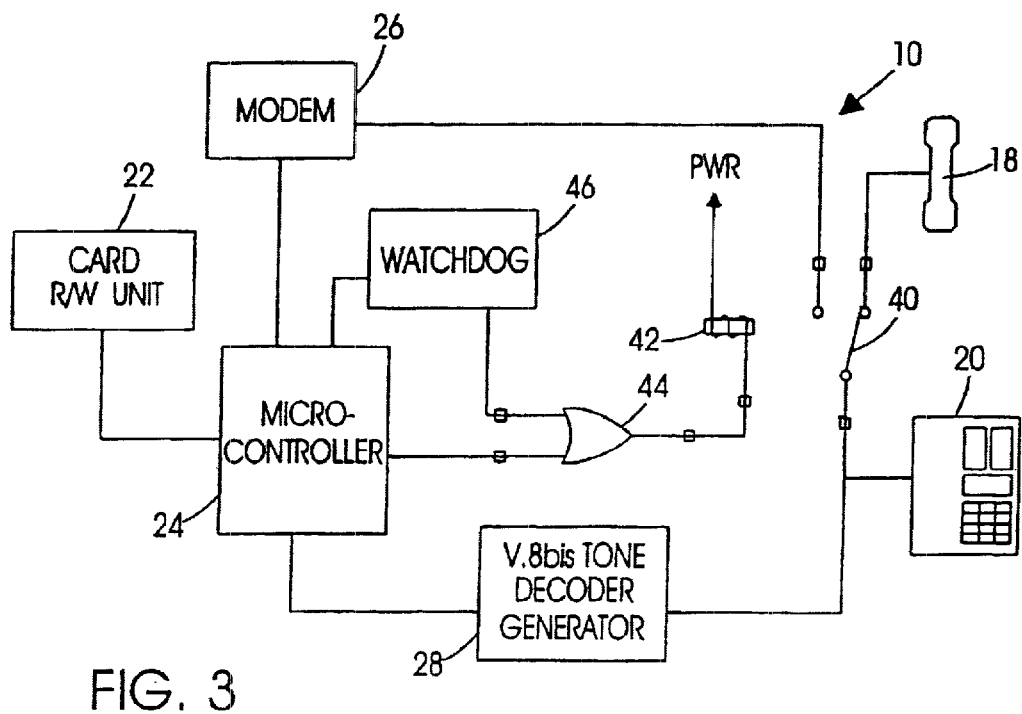
FIG. 3 is a schematic diagram of the smart card reader, showing a watchdog circuit and handset control.

FIG. 3 illustrates the operational links between the components shown in FIG. 2. The front-end 30 includes a switch 40 emulated by some contacts of a relay 42. The switch 40 is selectively connected to the handset 18 or to the modem circuit 26 which connects to the micro-controller 24. When the switch 40 is connected to the handset 18, the communication path from the micro-controller 24 through the modem circuit 26 to the application server 12 is disconnected and a user input mode is enabled. In the user input mode, there is no data exchange between the micro-controller 24 and the application server 12 but transaction information can be input through the keypad of the telephone terminal 16. The default position of the switch 40 connects the handset 18 to the telephone 20. Therefore, the switch 40 normally connects the base set 20 and the handset 18 so that the smart card reader 10 does not affect normal telephone operation when the smart card reader 10 is not in use. The switch 40 is actuated by a relay 42 to disconnect the handset 18 when the micro-controller 24 needs to exchange data through modem 26 with the application server 12. The relay 42 is energized by electric power supplied from the power supply unit 36 and controlled by a logic gate 44. The logic gate 44 is controlled by the micro-controller 28 and a watchdog circuit 46, as will be explained below in more detail. Mode selection is driven by a mode selection component 28 which includes a V.8 bis tone decoder and generator located between the micro-controller 24 and the analogue front-end 30. However, the V.8 bis tone decoder and generator is directly connected to the base set 20 of the telephone terminals 16 through the analogue front-end 30 and input to the circuit is not affected by the switch 40. Before the application server 12 is able to communicate with the smart card reader 10, it has to switch the smart card reader from a voice mode to a data mode and initiate a modem start-up procedure (V.25). This is accomplished using V.8 bis signalling (ITU COM 14-R, 19-E recommendation V.8 bis) as required by Mondex™ specifications. At that time, the handset 18 is preferably muted.

The V.8 bis protocol supports signalling and messaging. Signalling is used to indicate when a V.8 bis transaction begins. The signals are composed of two parts: segment 1 and segment 2. Segment 1 is a precise dual-frequency tone that is sent to initiate a V.8 transaction and segment 2 is a single frequency that represents one of three commands: ES (escape signal), MR (mode request), CR (capabilities request). Messages are transmitted using V.21 300 bps modulation. Because the application server 12 is aware that the smart card reader 10 is V.8 bis compatible, the application server 12 does not need to send any request messages. This minimizes the duration of the V.8 bis transaction. The minimum duration of a V.8 bis signal is 500 ms. The tone decoder detects segment 1 and segment 2 of V.8 bis signals. Once a valid V.8 bis signal is detected, the micro-controller 24 requires about 500 ms to activate the relay 42 that mutes the handset 18 and waits for the incoming V.8 bis message. When the signalling sequence is finished, the modem circuit 26 is started and configured in V.21 mode to receive an incoming message. The micro-controller 24 reads the message and takes appropriate responsive action.

The tone generator of the mode selection component 28 is used to initiate a V.8 bis signalling sequence for the purpose of, for example, inter-card reader transactions which will be explained below.

As described above, the logic gate 44 is connected at its output end to the relay 42 and at a first input to the micro-controller 24 and at a second input to a watchdog circuit 46 that resets the micro-controller 24 and reconnects the handset 18 to the base set 20. If the smart card reader 10 fails, the logic gate 44 connects the power circuit to a relay 42, activating the relay 42 and actuating the switch 40 to connect the modem circuit 26 to the telephone for the card communication mode when a V.8 bis tone is detected by the decoder 28 and read by the micro-controller 24. Nevertheless, the logic gate 44 disconnects the relay 42 from the power circuit and releases the switch 40 to its default position to reconnect the handset 18 for normal telephone use when an operation failure is detected by the watchdog 46. It should also be noted that if the smart card reader powers down or if the power fails, the switch 40 is automatically returned to the default position and the handset 18 is connected to the base set 20.

The micro-controller 24 incorporates a core processor (CPU), timers/counters, synchronous and asynchronous serial ports, memories (RAM, EPROM, FLASH), A/D converters and other peripherals. The CPU preferably complies to ISO 7816-3 and 7816-4 requirements and supports T=0 and T=1 protocol types. ISO 7816-3 specifies one bi-directional data line plus one clock for the serial communication interface (12C standard interface). The principal design assumption is that applications run on the application server. However, there is the exception that the smart card reader may be used to support a inter-card Mondex transactions. For this purpose, the micro-controller 24 should be enabled with software for small applications like reading and writing electronic funds transactions to the smart card. Sufficient memory is needed to support such small applications.

The smart card reader/writer unit 22 is preferably made of plastic and can be mounted directly on a printed circuit board (PCB). In a preferred embodiment, it provides eight pins for smart card contacts and one contact to detect full insertion of the card. A special circuit interfaces with the smart card reader/writer unit 22 to provide the necessary timing for powering, resetting and clocking the smart card. This circuit complies with the ISO 7816-3 and -4, and supports T=0 and T=1 protocol types.

The analogue front-end 30 also includes an automatic gain control (AGC) which ensures that handset volume control does not influence the V.8 bis tone detection circuit and modem operation.

The detection of segment 1 and segment 2 of V.8 bis signals can be done in several ways. In the first option, the incoming V.8 bis signal passes through a clipping circuit to convert sine to square wave forms and the duration is measured by the CPU using internal timers. The second option is to use a detection circuit with filters and phase lock loops (PLLs) able to discriminate V.8 bis from other signals (for example voice) that may occur at the same time. When a V.8 bis signal is detected by the detection circuit, a validating signal is sent to the CPU which measures the duration of the validating signal. The third option is to use a commercially available unitary tone decoder integrated circuit (IC). The forth option is use of a digital signal processor (DSP). An A/D converter is used to convert the signal and send it to the DSP in digital format. Then, the DSP processes the incoming data to validate V.8 bis signals. The DSP may be incorporated in the micro-controller.

There are also several ways for the tone generator to initiate a V.8 bis sequence. The first option is to use square waves synthesized by the CPU and wave shaping (square to sine) is done externally by an analogue circuit (low). The second option is to use an analogue sine wave generator, tuned by the CPU with a programmable potentiometer. The third option is use of a commercially available all-in-one tone generator (IC).

The modem circuit 26 supports V.21, V.22 bis, V.42 (also V.42 bis) which meets Mondex specifications. After a V.8 bis transaction is finished, data mode is activated and a V.25 modem start-up is initiated. Therefore, modems at each end (application server 12 and the smart card reader 10) are connected and an exchange of data begins. Because an AGC circuit is included in the analogue front-end 30, incoming signals are not affected by handset volume control of the telephone terminal 16. The data is read from and written to the modem by the CPU through a serial port which is preferably AT (Hayes) compatible to facilitate modem management)

The smart card reader may be powered by a battery pack or by power from a power converter of the telephone set, if available. At maximum demand the power requirement is about 1.3 W (5V×255 mA).

The display 32 is required by the Mondex specifications. Two lines by 16 characters 5×7 dots resolution with a back light option is preferred.

Function keys 34 are not mandatory per the Mondex specifications but are preferably included. The function keys 34 may be rubber switches with carbon contacts on the printed circuit board (PCB). The definition, and number of function keys 34, as well as the pictograms associated with the function keys 34 follow Mondex recommendations. Audible feedback is also preferred each time a key is pressed to indicate to the user that the depressed key has been detected. The smart card reader 10 incorporates a buzzer for this purpose. The display 32 may also be replaced by a voice generator but this is not the preferred option. Voice generation requires a lot of CPU memory plus special circuits. The per unit manufacturing cost is not impacted but the development costs are greater.

Figure 4:
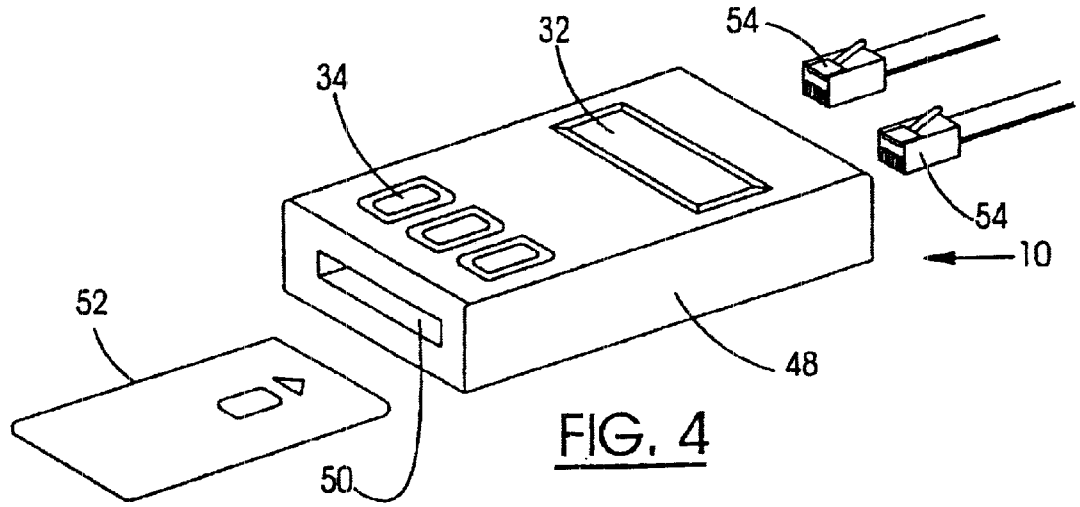
FIG. 4 which appears on sheet one of the drawings is a perspective view of the smart card reader.

FIG. 4 shows a perspective view of the smart card reader 10. All components of the smart card reader 10 are mounted in a custom plastic enclosure 48. A slot 50 for receiving a smart card 52 is at a front-end of the enclosure 48. The slot 50 may also be located in a top of the enclosure 48 instead of in the front. Because the smart card reader components are PCB mounted the orientation of the PCB must be changed if the slot is relocated. The function keys 34 and display 32 are on the top of the enclosure 48 and all connectors including power supply input and telephone terminals are at the rear of the enclosure 48. The connectors 54 used to connect the telephone base set 20 and handset 18 to the smart card reader 10 are RJ11 handset type connectors. One three-color LED (not shown) is preferably provided to display the following status: green for power on, yellow for communication in progress with the card and red for unit failure.

Smart card firmware includes the following software components:
 a main application that includes an application protocol layer for communication with the application server, watchdog relay control and three-color LED control. The watchdog circuit is kept active by a signal sent at least every second;
 flash memory management for writing and reading control;
 a smart card reader driver that includes a card reader through a synchronous serial port (one data line, one clock);
 a modem driver;
 a display/function keys driver that includes LCD/function key drivers as per the Mondex specification;
 a transport/network protocol layer as defined in the Mondex specification; and
 a Mondex electronic purse application that is explained in the Mondex specification.

Server-based card reader applications need not be interpreted and are passed through from the server to the card. For inter-smart card applications, Mondex software is preferably implemented.

Figure 5:
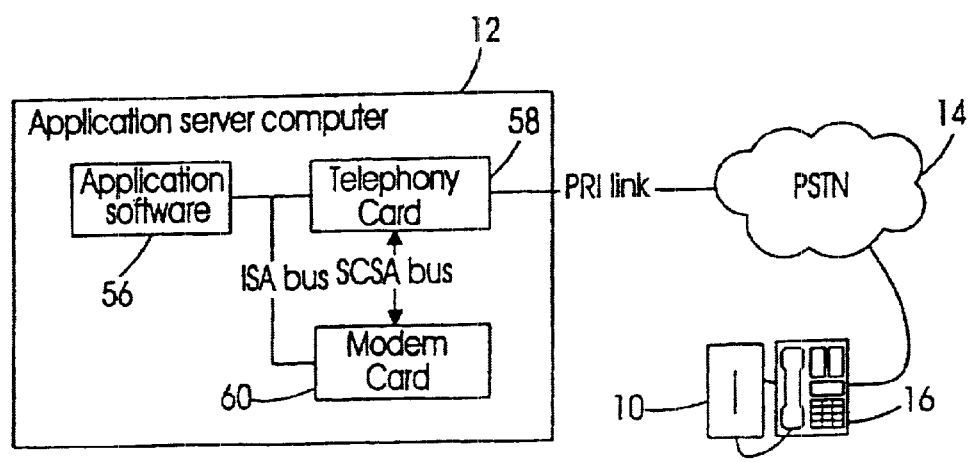
FIG. 5 which also appears on sheet one of the drawings is a block diagram of the application server used in the system of FIG. 1, showing the functional structure of the application server.

The main components of the application server 12 are illustrated in FIG. 5. The application server 12 includes application software 56 that provides smart card services. Other services such as an electronic telephone book may also be supported. The application software 56 is preferably configured to communicate and control two devices, an ADSI telephone and the smart card reader. If a regular telephone is used with the smart card reader 10, the ADSI component is not required. A telephony card 58 is used to communicate with the telephone terminal 16 for voice and ADSI protocol and a modem card provides a second interface used to communicate with the smart card reader 10. The telephony card 58 preferably includes up to 23 B channels, an interface for playing voice prompts, an interface for communications using ADSI protocol, a primary rate interface (PRI) communication link interface and a data bus that permits routing of B channels between the telephony card 58 and the modem card 60. The modem card 60 provides an interface for 24 modems supporting up to 56 KBPS and the data bus permits routing of B channels between the telephony card 58 and the modem card 60.

When a user dials the server, the service access number (DNIS) dialled by the user is used to determine which application process is started for the duration of the call. The application software 56 is responsible for all the interactions with the user and control of the smart card reader 10. The user interaction is directed using visual displays on the ADSI telephone combined with voice prompts. Only voice prompts are used when the smart card modem is connected to a regular telephone.

At the beginning of a session in which an ADSI telephone is used, the application software 56 uses ADSI protocol and voice prompts to guide the user through menus. During this time, the ADSI telephone terminal 16 is in data communication mode and is switched temporarily to voice mode to permit voice prompts to be played. The ADSI application software 56 is designed so that a CAS tone used to switch to data mode is normally heard only at the beginning of a session. This means that the temporary switch to voice does not require a CAS tone to return to data mode. The telephone terminal 16 may be instructed to switch to voice mode for a few seconds (time required to play a voice prompt for example) and return to data mode automatically. While the telephone terminal 16 is in data mode, the handset 18 is muted. With the smart card reader 10 connected to the handset 18, it is necessary to switch to voice mode to communicate with the smart card reader 10. There are two options for doing this. First, the temporary switch to voice may be used. In this case, the duration of the data transfer between the smart card 52 and the application server 12 has to be known and to be less than 127 seconds. The advantage of this option is no new CAS tone is needed to switch back to data mode. However, one has to be certain that data transfer will be terminated before the telephone switches back to data mode. The second option is to switch permanently to voice mode, do the data transfer and then reinitiate ADSI data mode by re-sending the CAS tone. This method is required for data transfers of unknown size. The best implementation is to use both options according to the type of data being exchanged. Of course, with a regular telephone, the application server does not need to switch to voice mode because the telephone is always in voice mode.

While in voice mode, communication with the smart card 10 can begin. The application software 56 must route the B channel used (0–23) to an available modem of the modem card. The B channel is routed by the data bus on two time slots (full duplex). The application software 56 can determine the time slot numbers using the telephony card. One of the modems is connected to these time slots. Then, the communication can begin.

The V.8 bis connection protocol is initiated by the modem card. The smart card reader tone decoder and the modem circuit 26 detect the tone and the connection process begins. As soon as a valid connection process begins, the smart card reader can mute the handset 18.

When the modems are synchronized, the application service layer protocol as defined in the Mondex specification is used between the application server 12 and the smart card reader to exchange information. The smart card reader 10 disconnects when the communication is completed, if the modem remote carrier is lost or the smart card 52 is removed from the reader slot 50, the application software 56 switches back into ADSI data mode to continue with the user interaction. In a normal situation, an End Data Transfer message is sent as defined in transport layer protocol of the Mondex protocol.

In order to illustrate a typical application and system behaviour, a sequence of events for a re-loadable telecom electronic purse as described as an example of a subset of multi-function telecom card applications.

1. A user inserts the smart card into the smart card reader 10. If the card is properly inserted, the smart card reader status LED blinks green, if not well inserted, the smart card reader status LED blinks red.

2. The user selects the telecom card service from the services key of the ADSI telephone or dials the application server number. After the number is dialled, the application server answers the call and according to the telephone number dialled, it starts a telecom card (TC) application. A TC application tests the ADSI compatibility of the user telephone set.

3. In the event that the user is requested to enter a personal identification number (PIN) and the communication is with an ADSI telephone, the system behaves as follows:
   a) a message is displayed asking for the PIN with a voice prompt;
   b) the user enters the PIN and presses OK, characters are displayed on display while the PIN is entered;
   c) the server application switches the telephone from data to voice mode;
   d) the server application establishes the communications with the smart card reader;
   e) the PIN is read from the smart card as well as other data that is required for later processing, for example, a credit card number, the amount of money on the card, etc.;
   f) the PIN is validated;
   g) if the PIN is invalid, steps a, b and f are repeated, and after three invalid attempts, the communication is terminated.

If the communication is not with an ADSI telephone:
   a) a voice prompt requesting the PIN is played;
   b) the user enters the PIN using the telephone keypad and presses the # key;
   c) the server applications establishes the communications with the smart card reader;
   d) the PIN is read from the smart card as well as other data as explained above;
   e) the PIN is validated; and
   f) if the PIN is invalid, steps a, b and e are repeated, and after three invalid attempts, the communication is terminated.

4. In order to select the electronic purse application, if an ADSI telephone:
   a) the server application switches the telephone from voice to ADSI data mode;
   b) a message is displayed asking for selection with a voice prompt; and
   c) the user selects electronic purse and presses OK.

If not an ADSI telephone:
   a) a voice prompt asking for service option selection is played, for example, press 1 for electronic purse, press 2 for . . . ; and
   b) the user selects electronic purse option by pressing the appropriate key on the telephone keypad.

5. The user may then key in his credit card number or validate the one already written on the card.

If an ADSI telephone is connected:
   a) a message is displayed asking for confirmation of a credit card number or entry of a credit card number with a voice prompt; and
   b) the user enters his credit card number and presses OK.

If not an ADSI telephone:
a) a voice prompt asks for confirmation of the credit card number or entry of a credit card number; and
b) the user enters the card number and presses "#".

6. The user keys in the amount to transfer to the card (restrictions may apply to the amount to transfer to the card).

If an ADSI telephone:
a) a message is displayed asking for the amount to transfer with a voice prompt (present amount on the card is to be displayed);
b) the user enters the amounts and presses OK;
c) fund availability is validated on-line;
d) if available, the server application switches the telephone from data to voice mode and establishes the communications with the smart card reader;
e) the amount is transferred to the card; and
f) confirmation of the new electronic value is displayed on the screen.

If not an ADSI telephone:
a) a voice prompt asks for the amount (present amount on card is also announced);
b) the user enters the amount and presses "#";
c) fund availability is validated on-line;
d) if funds are available, the server application switches the telephone from data to voice mode and establishes the communication with the smart card reader;
e) the amount is transferred to the card; and
f) confirmation of the new electronic value is announced.

As explained above with reference to FIG. 1b, another embodiment of the invention, the smart card reader 10 may be connected directly to the telephone line between the PSTN and the telephone base set 20 with no major structural change. Only the analogue front-end is impacted. In this embodiment, a switch in the front-end keeps the telephone terminal connected to a −48 V. power source to have the telephone terminal works properly while the smart card reader is in card communication mode and the telephone base set is disconnected from the PSTN 14. This embodiment is useful for implementation with handsfree telephones and the like.

We claim:

1. A portable smart card reader adapted for communication with an application server using a voice path of a switched telephone network, comprising:
   a smart card reader/writer unit for reading information from and writing information to a smart card;
   a front-end connected to a telephone line shared by a telephone terminal, the front-end being linked to the smart card reader/writer unit and adapted to selectively connect the smart card reader/writer unit to the telephone line to enable communication with the application server and to selectively disconnect the smart card reader/writer unit from the telephone line to permit a keypad of the telephone terminal to be used as a user interface for input of information during a smart card transaction session; and
   a micro-controller adapted to control operation of the smart card reader/writer unit and the front-end.

2. A smart card reader as claimed in claim 1 wherein the front-end, is adapted to be connected in series between a base set and a handset of the telephone terminal.

3. A smart card reader as claimed in claim 2 wherein the micro-controller controls a mode selection between a card communication mode and a user input mode during a card transaction session, and mutes the handset in the card communication mode.

4. A smart card reader as claimed in claim 1 further comprising a display unit associated with the micro-controller for displaying information.

5. A smart card reader as claimed in claim 3 further comprising a modem circuit linked between the micro-controller and the front-end for transmitting an electronic signal.

6. A smart card reader as claimed in claim 5 wherein the front-end comprises a switch controlled by the micro-controller for alternate connection of the base set with the handset or with the modem circuit to complete the mode selection.

7. A smart card reader as claimed in claim 6 further comprising a monitoring unit associated with the micro-controller and the switch for resetting the micro-controller and disconnecting the smart card reader from the handset if the card reader fails.

8. A smart card reader as claimed in claim 1 further comprising a connection detector associated with the micro-controller and the front-end for detecting a connection signal sent from the application server to activate the card communication mode.

9. A smart card reader as claimed in claim 1 further comprises a connection generator associated with the micro-controller and the front-end for sending out a connection signal.

10. A smart card reader as claimed in claim 6 wherein the switch connects the base set with the handset in a normal closed condition to ensure that the user input mode is a default mode.

11. A smart card reader as claimed in claim 1 wherein the smart card reader/writer unit comprises a slot for receiving insertion of the smart card.

12. A smart card reader as claimed in claim 1 further comprising a plurality of function keys as a user interface for function interaction.

13. A smart card reader as claimed in claim 1 wherein the micro-controller comprises memories and software to support inter-smart card applications.

14. A smart card reader as claimed in claim 4 wherein the display unit comprises liquid crystal display (LCD) for brief status message display.

15. A smart card transaction system that uses a voice path through a switched telephone network to perform smart card transactions, comprising:
   an application server connected to the switched telephone network;
   a telephone terminal connected to the switched telephone network by a telephone line, the telephone terminal having a keypad; and
   a portable smart card reader adapted to communicate with the application server, comprising:
      a smart card reader/writer unit for reading information from and writing information to a smart card;
      a front-end connected to the telephone line and linked to the smart card reader/writer unit, the front-end being adapted to selectively connect the smart card reader/writer unit to the telephone line for communication with the application server and selectively disconnect the smart card reader/writer unit from the telephone line to permit a keypad of the telephone terminal to be used as a user interface for input of information during a smart card transaction session; and
      a micro-controller adapted to control operation of the smart card reader/writer unit and the front-end.

16. A smart card transaction system as claimed in claim 15 wherein the telephone terminal comprises a base set with the keypad and a handset, the front-end of the card reader being connected in series between the base set and the handset.

17. A smart card transaction system as claimed in claim 16 wherein the micro-controller controls a mode selection between a card communication mode and a user input mode during the card transaction session, and mutes the handset in the card communication mode.

18. A smart card transaction system as claimed in claim 17 wherein the smart card reader comprises a modem circuit linked between the micro-controller and the front-end for transmitting electronic signals.

19. A smart card transaction system as claimed in claim 17 wherein the front-end comprises a switch controlled by the micro-controller for alternate connection of the base set with the handset or with the modem circuit to complete the mode selection.

20. A smart card transaction system as claimed in claim 19 wherein the smart card reader comprises a monitoring unit associated with the micro-controller and the switch for resetting the micro-controller and disconnecting from the handset if the card reader fails.

21. A smart card transaction system as claimed in claim 15 wherein the smart card reader comprises a display unit associated with the micro-controller for displaying information.

22. A smart card transaction system as claimed in claim 17 wherein the smart card reader comprises a connection signal detector associated with the micro-controller and the front-end for detecting a connection signal sent from the application server to activate the card communication mode.

23. A smart card transaction system as claimed in claim 15 wherein the smart card reader comprises a connection signal generator associated with the micro-controller and the front-end for sending out a connection signal.

24. A smart card transaction system as claimed in claim 19 wherein the switch connects the base set with the handset in a normally closed condition to ensure the telephone is in a user mode when the smart card reader is not in use.

25. A smart card transaction system as claimed in claim 15 wherein the smart card reader/writer unit comprises a slot for receiving insertion of the smart card.

26. A smart card transaction system as claimed in claim 15 wherein the smart card reader comprises a plurality of function keys as a user interface for function interaction.

27. A smart card transaction system as claimed in claim 15 wherein the micro-controller comprises memories and software to support inter-smart card applications without communication with the application server.

28. A smart card transaction system as claimed in claim 15 wherein the display comprises liquid crystal display (LCD) for brief status message display.

29. A smart card transaction system as claimed in claim 15 wherein the application server comprises:
  application software for providing services;
  a first interface associated with the application software to communicate with and control the telephone terminal; and
  a second interface associated with the application software to communicate with and control the smart card reader.

30. A smart card transaction system as claimed in claim 22 wherein the second interface generates a connection signal to prompt the smart card reader to switch to the card communications mode.

31. A smart card transaction system as claimed in claim 29 wherein the first interface provides the functions of:
  playing voice prompts;
  communication using analogue display service interface (ADSI) signal; and
  primary rate interface (PRI) communication link.

32. A smart card transaction system as claimed in claim 29 wherein the application server comprises an interactive voice response (IVR) unit for voice prompts.

33. A method of using a voice path through a switched telephone network for a smart card transaction comprising the steps of:
  a) connecting a smart card reader to a telephone line that provides telephone service to a telephone terminal;
  b) receiving, at an application server which is connected to the switched telephone network, a call for the smart card transaction from the telephone terminal connected to the telephone line;
  c) verifying from the application server that a smart card reader is connected to the telephone line of the switched telephone network and a smart card is properly associated therewith;
  d) receiving at the application server smart card user ID information which is input using a keypad of the telephone terminal in a user input mode;
  e) verifying at the application server the smart card user ID information by retrieving smart card user ID information from the smart card in a card communication mode and comparing the retrieved information with the input information;
  f) receiving at the application server transaction information which is input from the keypad in the user input mode;
  g) exchanging transaction data between the smart card and the application server in the card communication mode;
    whereby the application server is adapted to prompt the smart card reader to switch selectively between the user input mode that permits input through the keypad of the telephone terminal and the card communication mode that permits information exchange between the smart card and the application server.

34. A method as claimed in claim 33 wherein the user input mode is a default mode.

35. A method as claimed in claim 34 wherein the application server sends a connection signal to activate the switching from the user input mode to the card communication mode.

36. A method as claimed in claim 35 wherein the card communication mode mutes a handset of the telephone terminal.

37. A method as claimed in claim 36 wherein the application server sends the connection signal to activate the switching from the user input mode to the card communication mode for step b.

38. A method as claimed in claim 35 further comprising the steps after the communication of the telephone terminal with the application server is established:
  sending transaction menu messages from the application server to the telephone terminal to guide users through the card transaction session.

39. A method as claimed in claim 35 further comprising the step of:
  executing an action at the application server on receipt of an input signal from a function key associated with the smart card reader when the smart card reader is in the card communication mode and the function key is pressed.

40. A method as claimed in claim 35 wherein the smart card reader is connected in series between the handset and a base set of the telephone terminal.

41. A method as claimed in claim 35 wherein the application server communicates with and controls the telephone terminal through a first interface, and communicates with and controls the smart card reader through a second interface, the first and second interfaces being associated with software programs for enabling transaction services.

42. A method as claimed in claim 41 wherein the software programs guide users through transaction menus using analog display service interface (ADSI) signal and voice prompts via the first interface when the telephone terminal is an ADSI telephone.

43. A method as claimed in claim 42 wherein the software programs guide users through transaction menus using an interactive voice response (IVR) unit for voice prompts via the first interface when the telephone terminal is not an ADSI telephone.

44. A method as claimed in claim 42 wherein the application server switches the ADSI telephone to a voice mode when the application server communicates with the smart card reader.

\* \* \* \* \*